(12) United States Patent
Chang

(10) Patent No.: US 11,704,264 B2
(45) Date of Patent: Jul. 18, 2023

(54) DATA TRANSMISSION SYSTEM AND OPERATION METHOD THEREOF

(71) Applicant: MACRONIX INTERNATIONAL CO., LTD., Hsinchu (TW)

(72) Inventor: Yao-Jen Chang, Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 73 days.

(21) Appl. No.: 17/308,204

(22) Filed: May 5, 2021

(65) Prior Publication Data

US 2022/0358064 A1 Nov. 10, 2022

(51) Int. Cl.
*G06F 13/28* (2006.01)
*G06F 13/16* (2006.01)
*G06F 13/40* (2006.01)
*G06F 13/30* (2006.01)
*H04B 3/54* (2006.01)

(52) U.S. Cl.
CPC ........ *G06F 13/287* (2013.01); *G06F 13/1673* (2013.01); *G06F 13/30* (2013.01); *G06F 13/404* (2013.01); *H04B 3/542* (2013.01)

(58) Field of Classification Search
CPC ..... G06F 1/04; G06F 1/06; G06F 1/08; G06F 1/10; G06F 1/12; G06F 1/14; G06F 13/287; G06F 13/1673; G06F 13/30
See application file for complete search history.

(56) References Cited

U.S. PATENT DOCUMENTS

| 5,724,204 | A | 3/1998 | Shinohara et al. |
| 9,496,874 | B2 | 11/2016 | Kim |
| 10,659,258 | B1* | 5/2020 | Ramirez ............ H04L 25/0278 |
| 2003/0226082 | A1* | 12/2003 | Kim .................... G06K 19/073 |
| | | | 714/734 |
| 2004/0044808 | A1* | 3/2004 | Salmon ............... G06F 13/4072 |
| | | | 710/8 |
| 2012/0203937 | A1 | 8/2012 | Mohanty et al. |
| 2017/0085241 | A1* | 3/2017 | Guyette ................. H01P 1/127 |
| 2019/0386846 | A1 | 12/2019 | Kamada |
| 2022/0069806 | A1* | 3/2022 | Ishihara ................. H03D 7/161 |

FOREIGN PATENT DOCUMENTS

TW 201628347 A 8/2016

* cited by examiner

*Primary Examiner* — Raymond N Phan
(74) *Attorney, Agent, or Firm* — McClure, Qualey & Rodack, LLP

(57) ABSTRACT

A data transmission system and an operation method thereof are provided. The data transmission system includes a host, a first device and a second device. The host is configured to set a voltage base of a transmission signal, and configured to pull down or up the transmission signal based on the voltage base of the transmission signal to form a plurality of glitches. The first device is connected to the host to receive the transmission signal. The first device obtains a digital content of the transmission signal according to the glitches, if the voltage base of the transmission signal is set as a first base. The second device is connected to the host to receive the transmission signal. The second device obtains the digital content of the transmission signal according to the glitches, if the voltage base of the transmission signal is set as a second base.

20 Claims, 14 Drawing Sheets

DATA TRANSMISSION SYSTEM AND OPERATION METHOD THEREOF

TECHNICAL FIELD

The disclosure relates in general to a communication system and an operation method thereof, and more particularly to a data transmission system and an operation method thereof.

BACKGROUND

In traditional single ending transmission on the printed circuit board or other application, the digital signal is transmitted with different voltage levels according to the clock information. After the single ending transmission reaches 200 MHz, the signal transmission quality immediately becomes a serious challenge.

The traditional single ending transmission adopts the technique of synchronous clock edge sampling. When the signal frequency becomes higher, the quality of signal transmission can easily lead to signal transmission quality problems due to poor PCB layout, internal and external interference, noise, data received error, etc.

Researchers are working to develop a transmission technology that can maintain signal quality even at high frequencies, and achieve the advantages of reducing the number of electrical connections and multipoint communication.

SUMMARY

The disclosure is directed to a data transmission system and an operation method thereof. Glitches are used to represent the digital content, so the communication can be performed without clock edge sampling. Therefore, the signal quality can be maintained even at high frequencies. Further, voltage base is used for selecting the devices, so the number of electrical connections can be reduced.

According to one embodiment, a data transmission system is provided. The data transmission system includes a host, a first device and a second device. The host is configured to set a voltage base of a transmission signal, and configured to pull down or up the transmission signal based on the voltage base of the transmission signal to form a plurality of glitches on the transmission signal. The first device is connected to the host to receive the transmission signal. The first device obtains a digital content of the transmission signal according to the glitches on the transmission signal, if the voltage base of the transmission signal is set as a first base. The second device is connected to the host to receive the transmission signal. The second device obtains the digital content of the transmission signal according to the glitches on the transmission signal, if the voltage base of the transmission signal is set as a second base.

According to another embodiment, an operation method of a data transmission system is provided. The data transmission system comprises a host, a first device and a second device. The first device and the second device are connected to the host. The operation method of the data transmission system includes the following steps. A voltage base of a transmission signal is set by the host. The transmission signal is pulled down or up by the host based on the voltage base of the transmission signal to form a plurality of glitches on the transmission signal. The transmission signal is received by the first device and the second device. A digital content of the transmission signal is obtained by the first device according to the glitches on the transmission signal, if the voltage base of the transmission signal is set as a first base. The digital content of the transmission signal is obtained by the second device according to the glitches on the transmission signal, if the voltage base of the transmission signal is set as a second base.

According to an alternative embodiment, a data transmission system is provided. The data transmission system includes a host and a device. The host is configured to pull down or up the transmission signal based on the voltage base of the transmission signal to form a plurality of glitches on the transmission signal. The device is connected to the host to receive the transmission signal. The device obtains a digital content of the transmission signal according to the glitches on the transmission signal.

Figure 1:
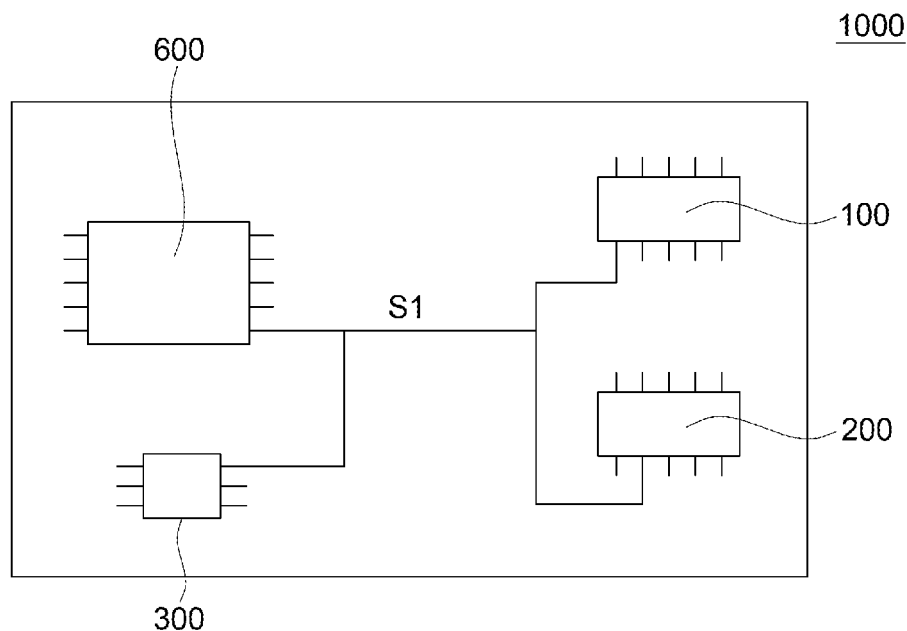
FIG. 1 shows a data transmission system according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1, which shows a data transmission system 1000 according to one embodiment. The data transmission system 1000 of FIG. 1 is, for example, a circuit board. In another embodiment, the data transmission system 1000 may be adopted to any wired digital communication, such as the communication between computers or the communication between processor and disks. As shown in FIG. 1, the data transmission system 1000 includes a host 600, a first device 100, a second device 200 and a third device 300. The number of the devices is not used to limit the present invention. The host 600 is, for example, a processor or a controller. The first device 100, the second device 200 and/or the third device 300 is, for example, a memory or a disk. In the present embodiment, the host 600 can selectively transmit a digital content to the first device 100, the second device 200 or the third device 300 through a transmission signal S1. All of the first device 100, the second device 200 and the third device 300 receive the transmission signal S1, but only one of the first device 100, the second device 200 and the third device 300 obtains the digital content.

Figure 2:
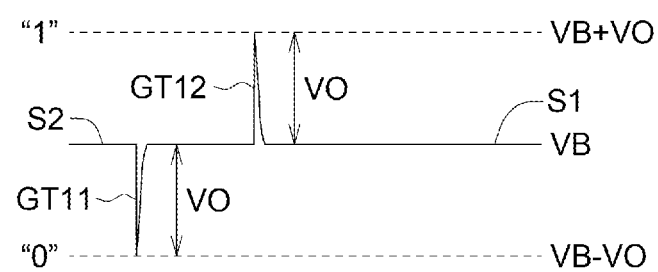
FIG. 2 shows a transmission signal according to one embodiment.

Refer to FIG. 2. FIG. 2 shows a transmission signal S2 according to one embodiment. The host 600 pulls down or up the transmission signal S2 based on a voltage base VB to form a plurality of glitches GT11, GT12 on the transmission signal S2. For example, the transmission signal S2 is instantly pulled down from the voltage base VB by an offset VO to form the glitch GT11; the transmission signal S2 is instantly pulled up from the voltage base VB by the offset VO to form the glitch GT12. The glitch GT11 represents "0" and the glitch GT12 represents "1."

Figure 3:
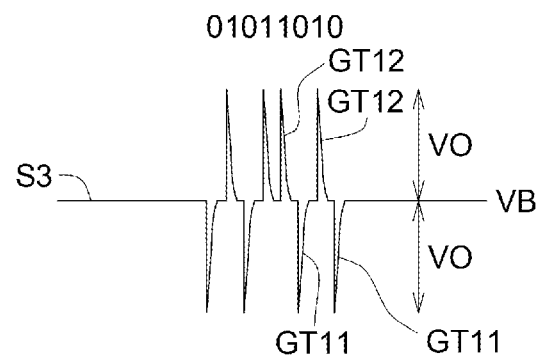
FIG. 3 which shows a digital content "0x5A" according to one embodiment.

Refer to FIG. 3, which shows a digital content "0x5A" according to one embodiment. The glitches GT11 that are formed by pulling down a transmission signal S3 from the voltage base VB have identical amplitude, such as the offset VO, so the glitches GT11 represent identical digital value, i.e. "0." The glitches GT12 that are formed by pulling up the transmission signal S3 from the voltage base VB have identical amplitude, such as the offset VO, so the glitches GT12 represent identical digital value, i.e. "1." Each of the glitches GT11, GT12 is represented one bit data. As shown in FIG. 3, "01011010", i.e. "0x5A", is obtained according to the glitches GT11, GT12 on the transmission signal S3.

Figure 4:
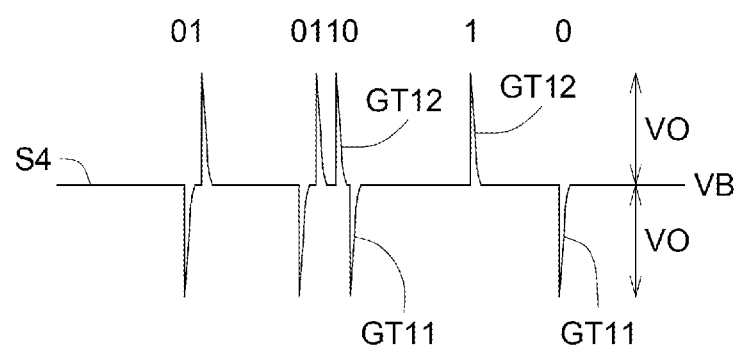
FIG. 4 shows the digital content "0x5A" according to another embodiment.

Refer to FIG. 4, which shows the digital content "0x5A" according to another embodiment. As shown in FIG. 4, the intervals among the glitches GT11, GT12 on a transmission signal S4 are different. That is to say, the glitches GT11, GT12 are not formed according to any clock signal. Some of the intervals are larger than that in FIG. 3. Regardless of the time received the glitches GT11, the glitches GT11 still represent "0." Regardless of the time received the glitches GT12, the glitches GT12 still represent "1." Therefore, in FIG. 4, "01011010", i.e. "0x5A", is also obtained according to the glitches GT11, GT12 on the transmission signal S4.

Referring to FIG. 3 and FIG. 4, "0x5A" can be obtained according to the transmission signal S3 in FIG. 3 or the transmission signal S4 in FIG. 4. Any clock signal is not needed for transmitting the digital content "0x5A." The communication starts at the point where the first glitch appears. The proposed transmission is neither synchronous transmission nor asynchronous transmission. It can be regarded as a trigger transmission, and the transmission speed can be dynamic and not fixed. During the communication, even if some of the bits are delayed, "0x5A" still can be obtained.

Figure 5:
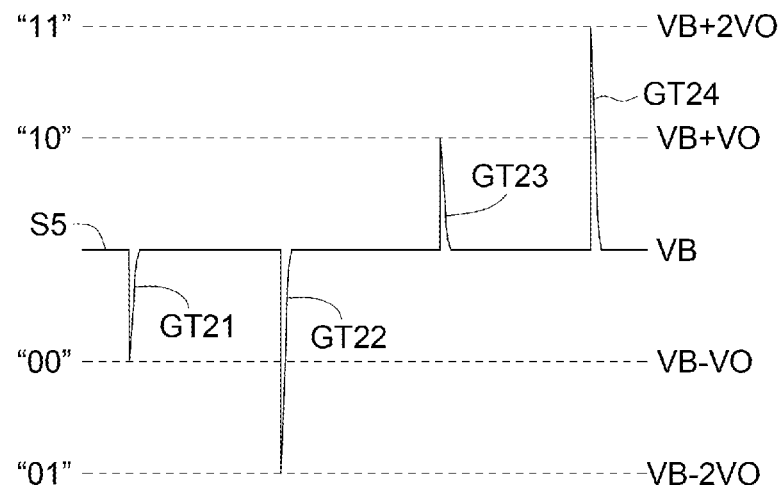
FIG. 5 shows a transmission signal according to another embodiment.

Refer to FIG. 5. FIG. 5 shows a transmission signal S5 according to another embodiment. The host 600 pulls down or up the transmission signal S5 based on the voltage base VB to form a plurality of glitches GT21, GT22, G23, G24 on the transmission signal S5. For example, the transmission signal S5 is instantly pulled down from the voltage base VB by one offset VO to form the glitch GT21; the transmission signal S5 is instantly pulled down from the voltage base VB by two offsets VO to form the glitch GT22; the transmission signal S5 is instantly pulled up from the voltage base VB by one offset VO to form the glitch GT23; the transmission signal S5 is instantly pulled up from the voltage base VB by two offsets VO to form the glitch GT24. The glitch GT21 represents "00", the glitch GT22 represents "01", the glitch GT23 represents "10", and the glitch GT24 represents "11." The glitches GT21, GT22 that are formed by pulling down from the voltage base VB have two kinds of amplitudes, such as one offset VO and two offsets VO, so the glitch GT21 and the glitch GT22 represent different digital value, i.e. "00" and "01." The glitches GT23, GT24 that are formed by pulling up from the voltage base VB have different amplitudes, such as one offset VO and two offsets VO, so the glitch GT23 and the glitch GT24 represent different digital value, i.e. "10" and "11." Each of the glitches GT21, GT22, GT23, GT24 is represented two bits data.

In other embodiment, the glitches that are formed by pulling up or pulling down from the voltage base may have $2^x$ kinds of amplitudes, such that each of the glitches is represented X bits data.

Figure 6:
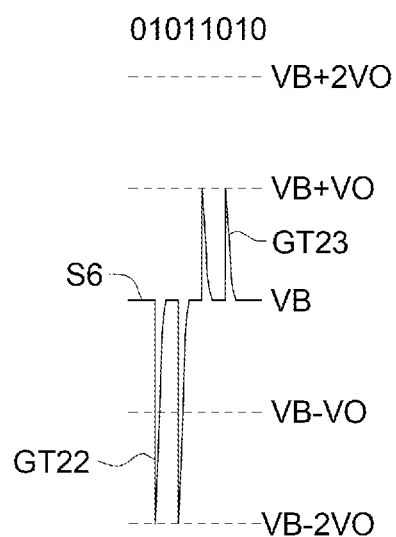
FIG. 6 shows the digital content "0x5A" according to another embodiment.

Refer to FIG. 6, which shows the digital content "0x5A" according to another embodiment. As shown in FIG. 6, "01011010", i.e. "0x5A", is obtained according to a transmission signal S6. Each of the glitches GT22, GT23 on the transmission signal S6 is represented two bits data. Comparing the transmission signal S6 in FIG. 6 and the transmission signal S3 in FIG. 3, the number of the glitches on the transmission signal S6 is less than that of the transmission signal S3.

Figure 7:
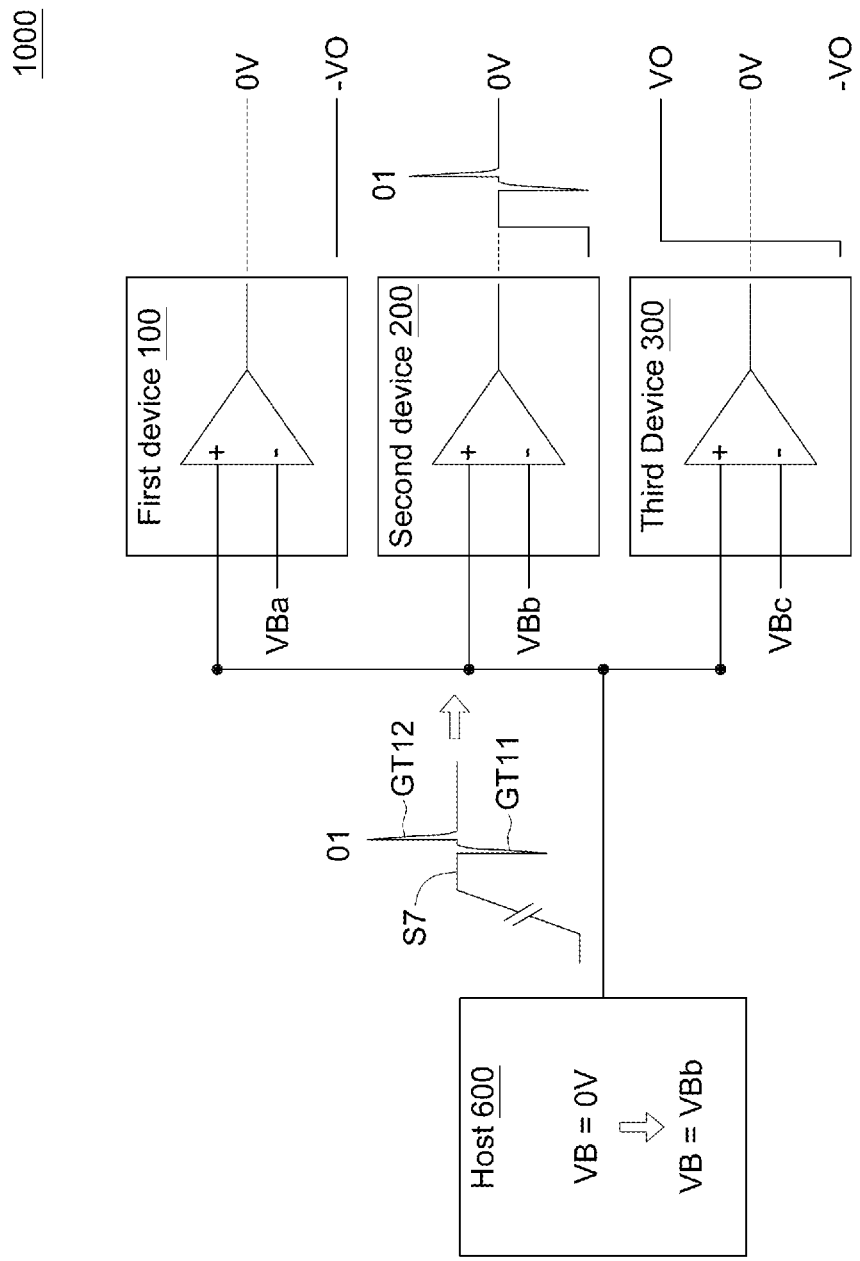
FIG. 7 shows a block diagram of the data transmission system according to one embodiment.
Figure 8:
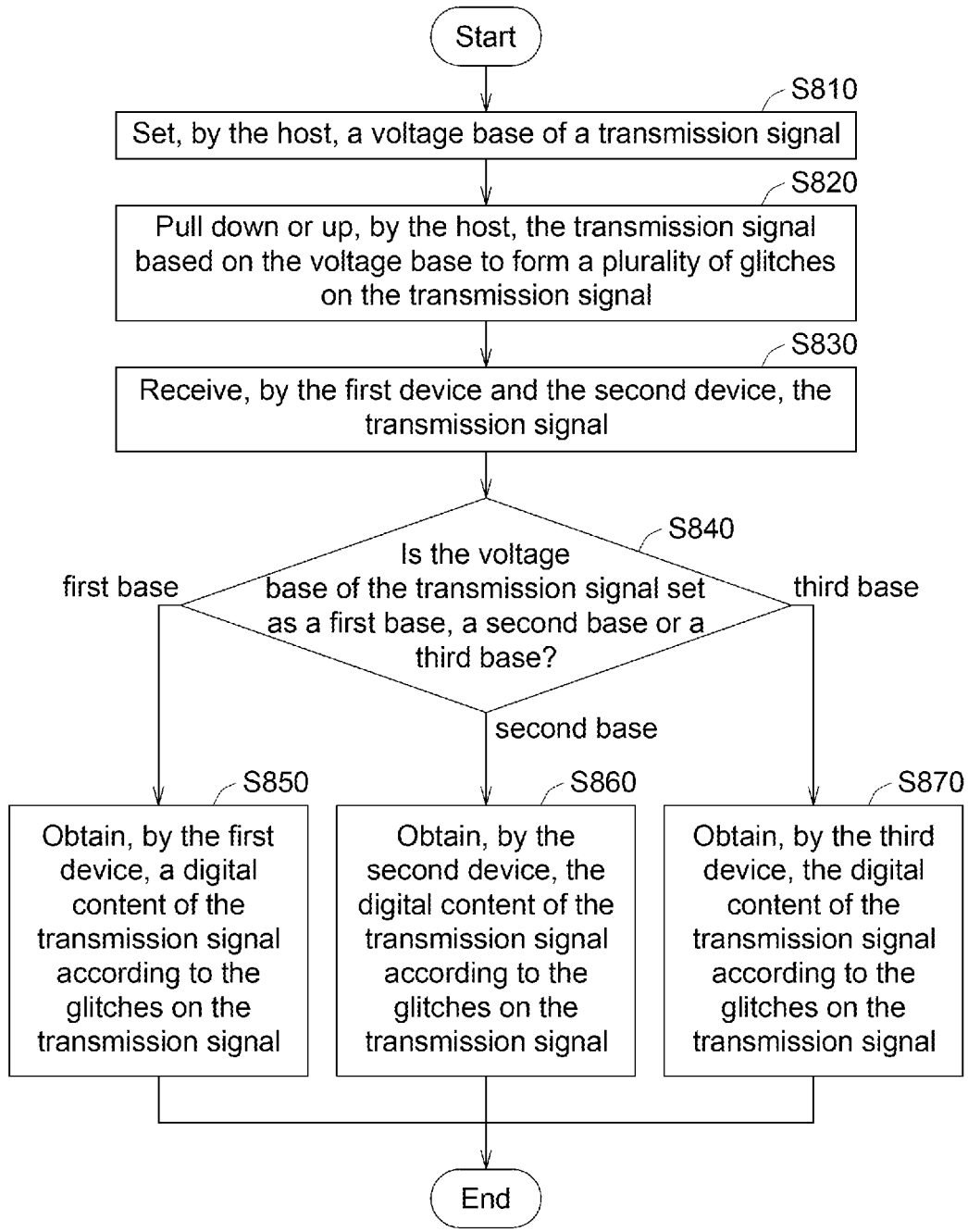
FIG. 8 shows a flowchart of an operation method of the data transmission system according to one embodiment.

Refer to FIGS. 7 and 8. FIG. 7 shows a block diagram of the data transmission system 1000 according to one embodiment. FIG. 8 shows a flowchart of an operation method of the data transmission system 1000 according to one embodiment. In step S810, the host 600 sets the voltage base VB of a transmission signal S7. For example, referring to FIG. 7, the host 600 may set the voltage base VB of the transmission signal S7 as being a first base VBa, a second base VBb or a third base VBc. The first base VBa, the second base VBb and the third base VBc are, for example, 3V, 2V and 1V.

Then, in step S820, the host 600 pulls down or up the transmission signal S7 based on the voltage base VB by one or more offsets VO to form the glitches GT11, GT12 (or GT21, GT22, GT23, GT24) on the transmission signal S7. The glitches GT21, GT22, GT23, GT24 are shown in FIG. 5. The offset VO is, for example, 0.5V or 0.4V.

Next, in step S830, the first device 100, the second device 200 and the third device 300 receive the transmission signal S7.

Afterwards, in step S840, whether the voltage base VB of the transmission signal S7 is set as the first base VBa, the second base VBb or the third base VBc is determined by the first device 100, the second device 200 and the third device 300. If the first device 100 determines that the voltage base VB of the transmission signal S7 is set as the first base VBa, the process proceeds to step S850; if the second device 200 determines that the voltage base VB of the transmission signal S7 is set as the second base VBb, the process proceeds to step S860; if the third device 300 determines that the voltage base VB of the transmission signal S7 is set as the third base VBc, the process proceeds to step S870.

In the step S850, the first device 100 obtains the digital content of the transmission signal S7 according to the glitches GT11, GT12 (or GT21, GT22, GT23, GT24) on the transmission signal S7.

In the step S860, the second device 200 obtains the digital content of the transmission signal S7 according to the glitches GT11, GT12 (or GT21, GT22, GT23, GT24) on the transmission signal S7.

In the step S870, the second device 300 obtains the digital content of the transmission signal S7 according to the glitches GT11, GT12 (or GT21, GT22, GT23, GT24) on the transmission signal S7.

As shown in FIG. 7, the voltage base VB of the transmission signal S7 is set as the second base VBb, so only the second device 200 obtains the digital content "01" of the transmission signal S7 according to the glitches GT11, GT12 on the transmission signal S7. Base on above, the host 600 can set the voltage base VB to selectively transmit the digital content to particular one of the first device 100, the second device 200 and the third device 300. During the communication, the host 600 does not need to transmit any enable signal through a particular line to the first device 100, the second device 200 or the third device 300. The connections among the host 600, the first device 100, the second device 200 and the third device 300 can be reduced.

In FIGS. 7 and 8, three devices, i.e. the first device 100, the second device 200 and the third device 300 are taken as an example. However, the number of the devices is not used to limit the present invention. In other embodiment, the data transmission system may include two devices, or the data transmission system may include more than three devices. The host 600 can set the voltage base VB as being particular base corresponding to particular one of the device, such that the digital content can be selectively transmitted to this device.

Figure 9:
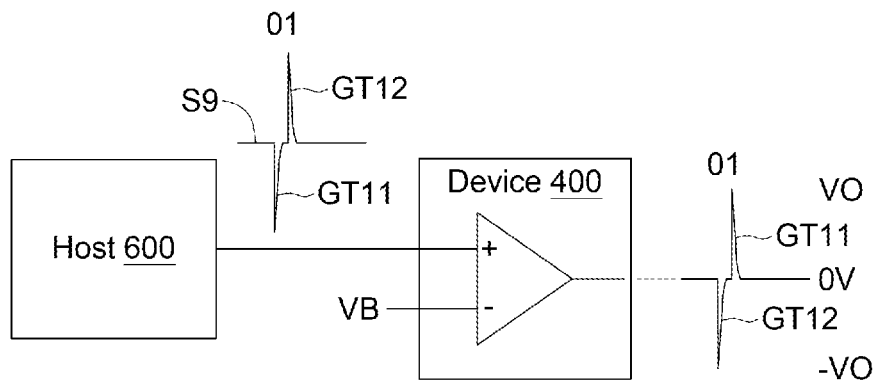
FIG. 9 shows a block diagram of a data transmission system according to another embodiment.
Figure 10:
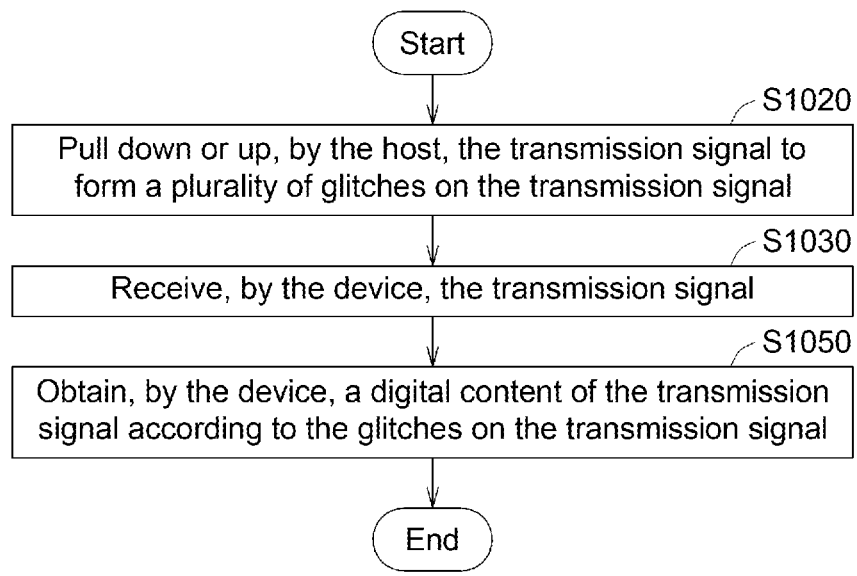
FIG. 10 shows a flowchart of an operation method of the data transmission system according to one embodiment.

Refer to FIGS. 9 and 10. FIG. 9 shows a block diagram of a data transmission system 2000 according to another embodiment. FIG. 10 shows a flowchart of an operation method of the data transmission system 2000 according to one embodiment. The data transmission system 2000 includes the host 600 and only one device 400. Because the number of the device 400 is one, the voltage base VB is no longer needed for the operation method. In step S1020, the host 600 pulls down or up a transmission signal S9 by one or more offsets VO to form the glitches GT11, GT12 (or GT21, GT22, GT23, GT24) on the transmission signal S9. The glitches GT21, GT22, GT23, GT24 are shown in FIG. 5. The offset VO is, for example, 0.5V or 0.4V.

Next, in step S1030, the device 400 receives the transmission signal S9.

Afterwards, in step S1050, the device 400 obtains a digital content of the transmission signal S9 according to the glitches GT11, GT12 (or GT21, GT22, GT23, GT24) on the transmission signal S9. As shown in FIG. 9, regardless of whether there is any interference causing signal delay, the device 400 can still obtain the digital content "01" correctly.

Figure 11:
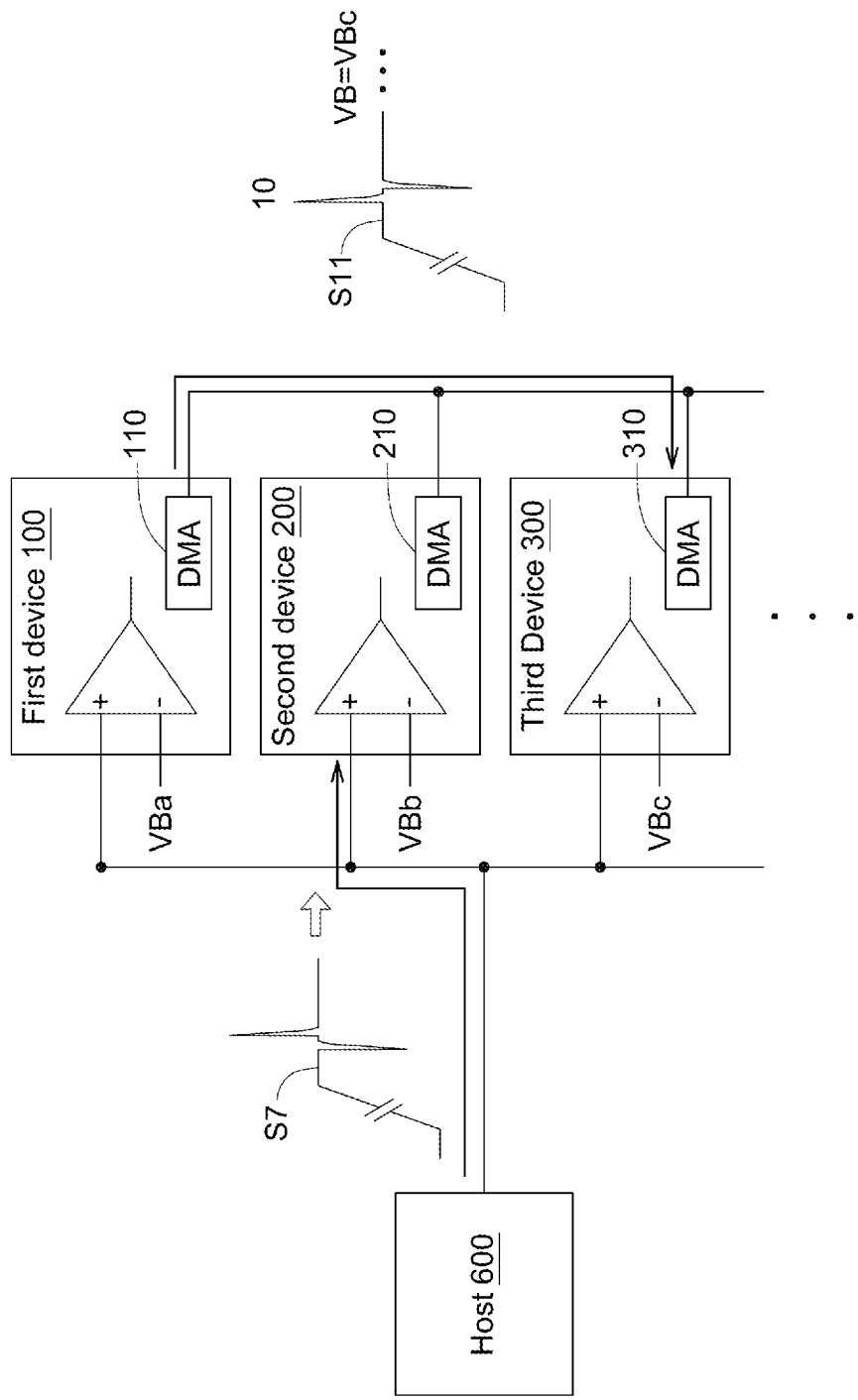
FIG. 11 shows a block diagram of a data transmission system which performs a device direct memory access procedure (device DMA procedure).
Figure 12:
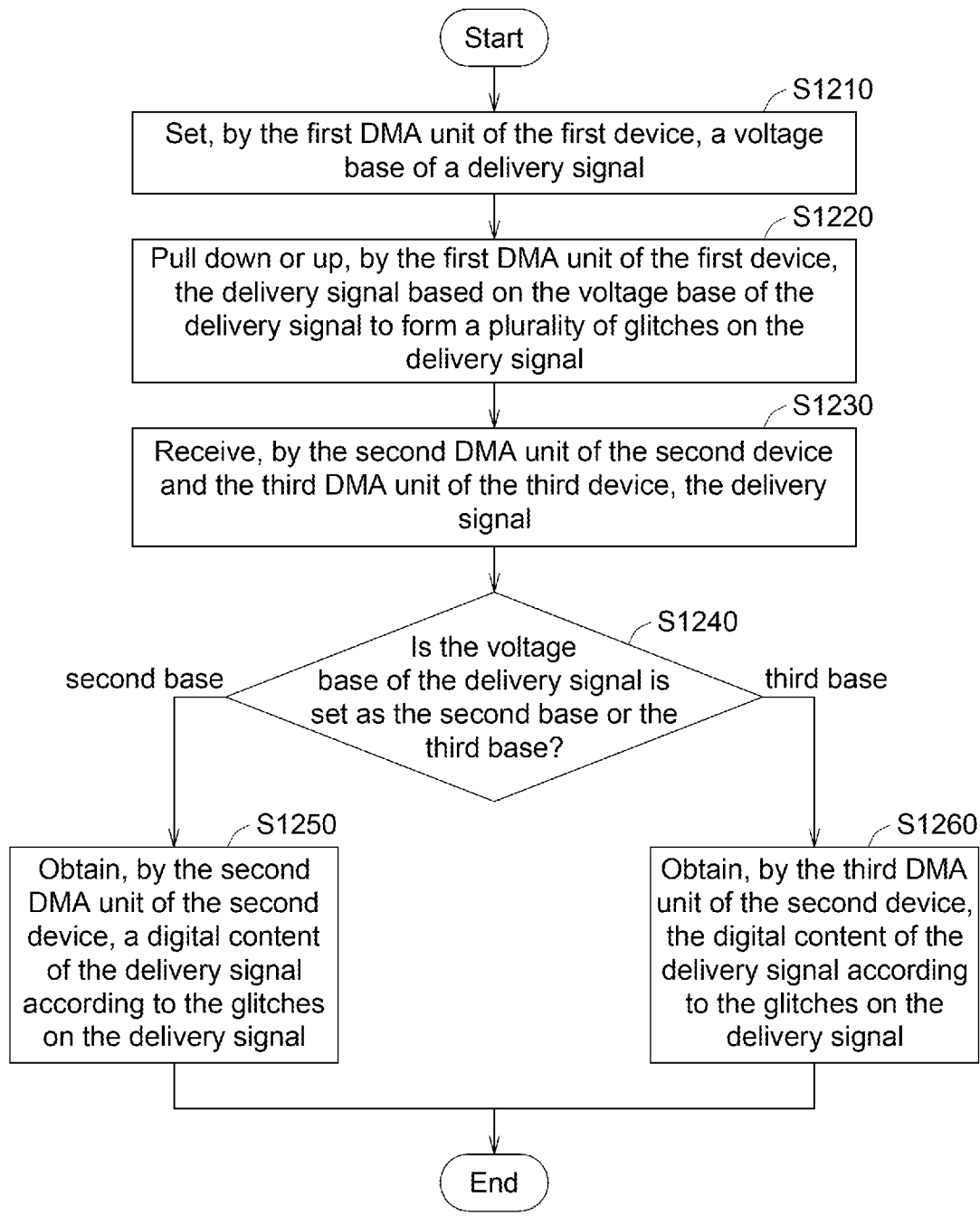
FIG. 12 shows a flowchart of the device DMA procedure.

Refer to FIGS. 11 and 12. FIG. 11 shows a block diagram of a data transmission system 3000 which performs a device direct memory access procedure (device DMA procedure). FIG. 12 shows a flowchart of the device DMA procedure. In the data transmission system 3000, the first device 100 includes a first direct memory access (DMA) unit 110, the second device 200 includes a second DMA unit 210, and the third device 300 includes a third DMA unit 310. In the example of FIG. 12, a digital content is directed transmitted from the first device 100 to the second device 200 or the third device 300. In step S1210, the first DMA unit 110 of the first device 100 set the voltage base VB of a delivery signal S11. For example, referring to FIG. 11, the first DMA unit 110 may set the voltage base VB of the delivery signal 311 as being the second base VBb or the third base VBc. The second base VBb and the third base VBc are, for example, 2V, 1V.

Next, in step S1220, the first DMA unit 110 of the first device 100 pulls down or up the delivery signal S11 based on the voltage base VB of the delivery signal S11 by one or more offsets VO to form the glitches GT11, GT12 (or GT21, GT22, GT23, GT24) on the delivery signal S11. The glitches GT21, GT22, GT23, GT24 are shown in FIG. 5. The offset VO is, for example, 0.5V or 0.4V.

Then, in step S1230, the second DMA unit 210 of the second device 200 and the third DMA unit 310 of the third device 300 receive the delivery signal S11.

Afterwards, in step S1240, whether the voltage base VB of the delivery signal S11 is set as the second base VBb or the third base VBc is determined by the second DMA unit 210 of the second device 200 and the third DMA unit 310 of the third device 300. If the second DMA unit 210 of the second device 200 determines that the voltage base VB of the delivery signal S11 is set as the second base VBb, the process proceeds to step S1250; if the third DMA unit 310 of the third device 300 determines that the voltage base VB of the delivery signal S11 is set as the third base VBc, the process proceeds to step S1260.

In the step S1250, the second DMA unit 210 of the second device 200 obtains the digital content of the delivery signal S11 according to the glitches GT11, GT12 (or GT21, GT22, GT23, GT24) on the delivery signal S11.

In the step S1260, the third DMA unit 310 of the third device 300 obtains the digital content of the delivery signal S11 according to the glitches GT11, GT12 (or GT21, GT22, GT23, GT24) on the delivery signal S11.

Base on above, the delivery signal S11 can be directly transmitted from the first device 100 to the second device 200 or the third device 300 without using the host 600. The transmission signal S7 and the delivery signal S11 can be transmitted at the same time without conflict. Only two lines are needed for transmitting the transmission signal S7 and the delivery signal S11.

Figure 13:
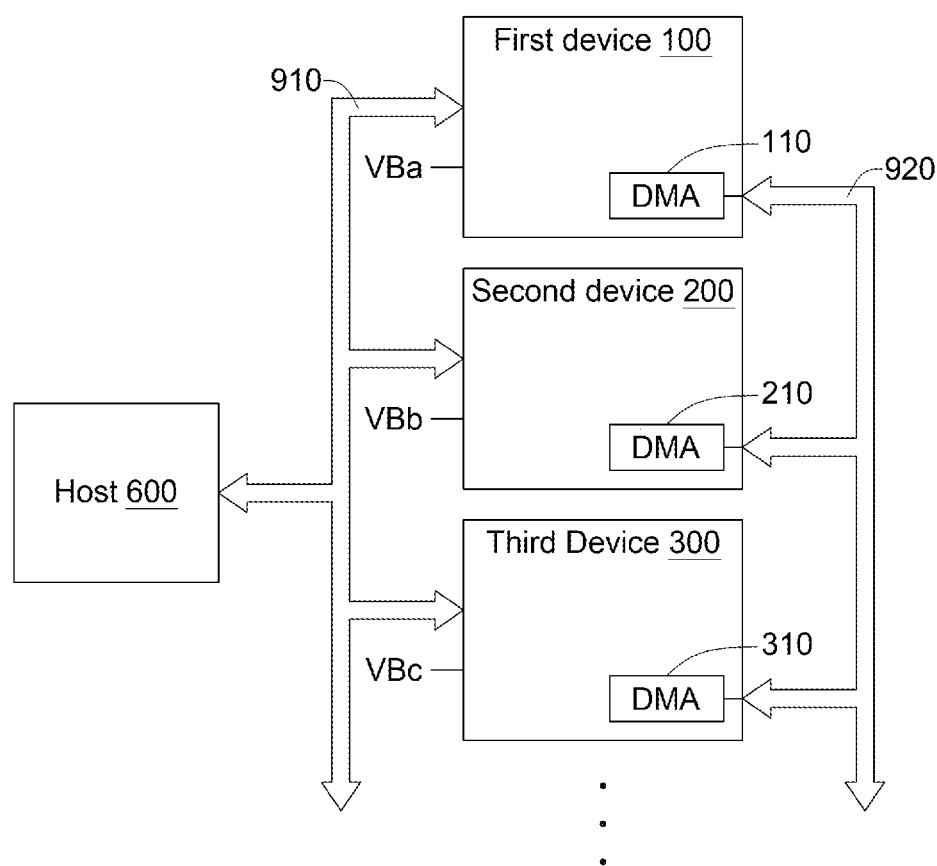
FIG. 13 shows a block diagram of a data transmission system according to another embodiment.

Referring to FIG. 13, which shows a block diagram of a data transmission system 4000 according to another embodiment. In FIG. 13, the host 600, the first device 100, the second device 200 and the third device 300 are connected through a bus 910 having a plurality of input/output channels; the first DMA unit 110 of the first device 100, the second DMA unit 210 of the second device 200 and the third DMA unit 310 of the third device 300 are connected through a bus 920 having a plurality of input/output channels. Due to the multi-input/output channels, the transmission efficiency can be greatly improved.

Figure 14:
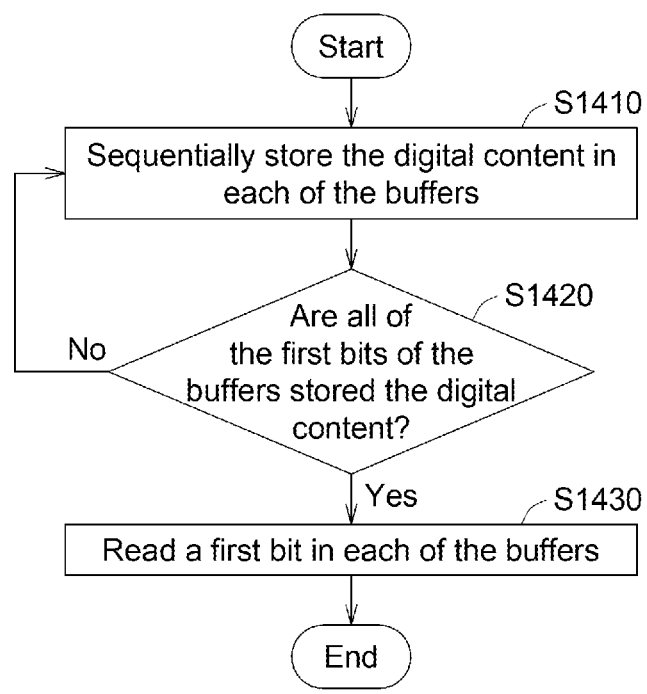
FIG. 14 shows a flowchart of the transmission on the bus having multi-input/output channels.
Figure 15:
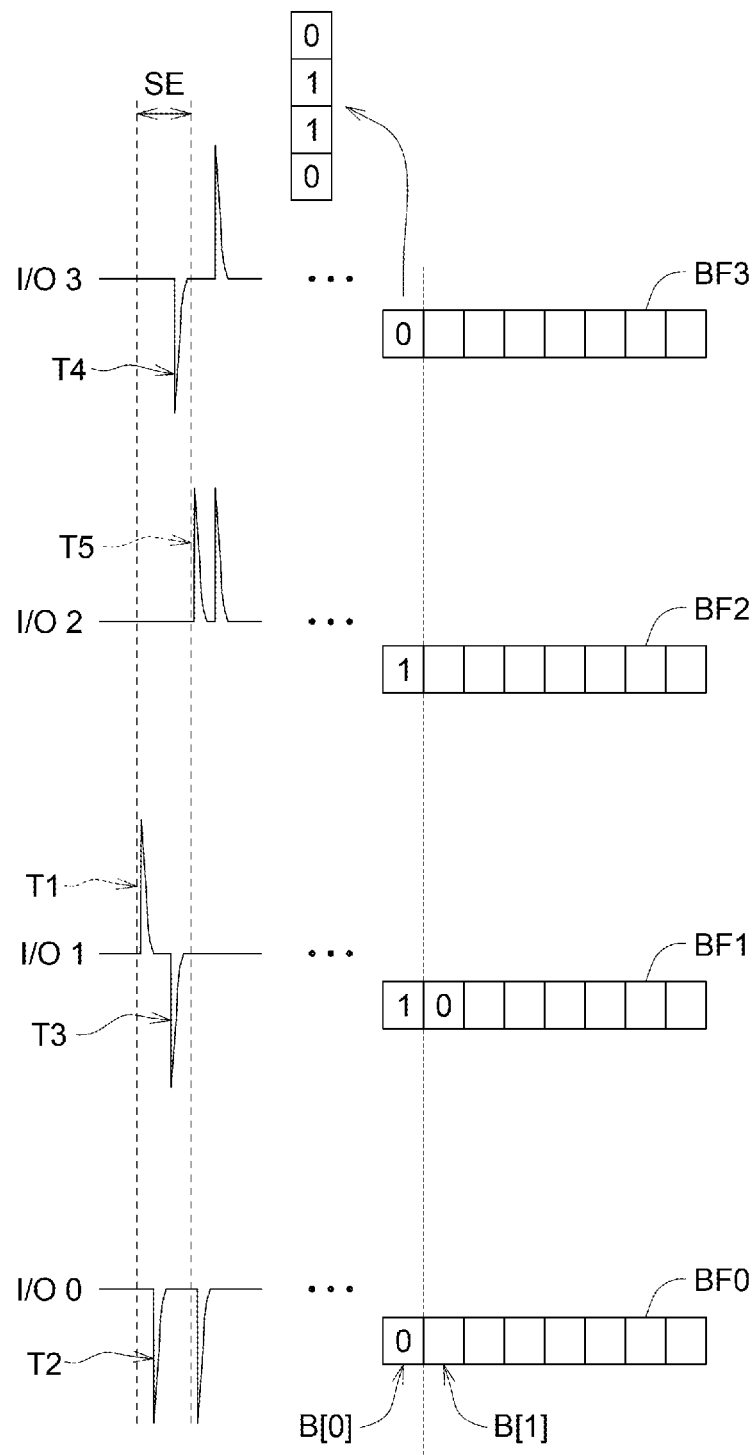
FIG. 15 illustrates the steps of FIG. 14.

Refer to FIGS. 14 and 15. FIG. 14 shows a flowchart of the transmission on the bus 910, 920 having multi-input/output channels. FIG. 15 illustrates the steps of FIG. 14. In FIG. 15, four input/output channels I/O0, I/O1, I/O2, I/O3 are shown. The input/output channel I/O0 has a buffer BF0; the input/output channel I/O1 has a buffer BF1; the input/output channel I/O2 has a buffer BF2; the input/output channel I/O3 has a buffer BF3. The size of each of the buffers BF0, BF1, BF2, BF3 is larger than or equal to 2 bits, such as 8 bits or 4 bits. The larger the buffers BF0, BF1, BF2, BF3, the larger the tolerable large synchronization error SE.

In step S1410, the digital contents are sequentially stored in each of the buffers BF0, BF1, BF2, BF3. For example, at time T1, the input/output channel I/O1 receives "1" and "1"

is stored in first bit B[0] of the buffer BF1. At time T2, the input/output channel I/O0 receives "0" and "0" is stored in first bit B[0] of the buffer BF0. At time T3, the input/output channel I/O1 receives "0" and "0" is stored in second bit B[1] of the buffer BF1. At time T4, the input/output channel I/O3 receives "0" and "0" is stored in first bit B[0] of the buffer BF3. At time T5, the input/output channel I/O2 receives "1" and "1" is stored in first bit B[0] of the buffer BF2.

Then, in step S1420, whether all of the first bits B[0] of the buffers BF0, BF1, BF2, BF3 are stored the digital content is determined. When all of the first bits B[0] of the buffers BF0, BF1, BF2, BF3 are stored the digital content, the process proceeds to step S1430.

In step S1430, the first bit B[0] in each of the buffers BF0, BF1, BF2, BF3 is read. For example, "0", "1", "1", "0" stored in the first bit B[0] are read. That is, in the transmission on the bus 910, 920 having multi-input/output channels, the digital content can be correctly read under the synchronization error SE.

Figure 16:
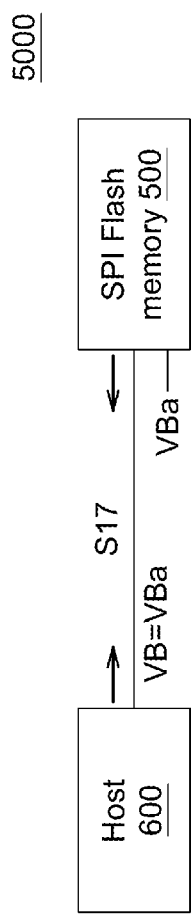
FIG. 16 shows a data transmission system which is a SPI (serial peripheral interface) flash memory system.
Figure 17:
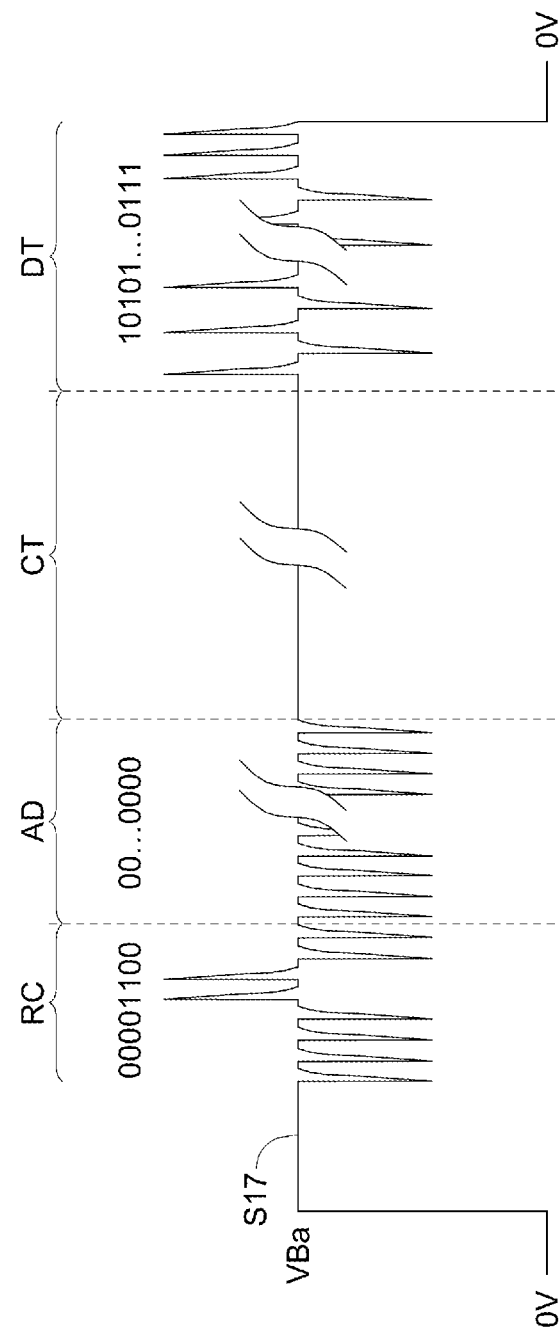
FIG. 17 shows a transmission signal transmitted in FIG. 16.

Refer to FIGS. 16 and 17. FIG. 16 shows a data transmission system 5000 which is a SPI (serial peripheral interface) flash memory system. FIG. 17 shows a transmission signal S17 transmitted in FIG. 16. The data transmission system 5000 includes the host 600 and a SPI flash memory 500. The host 600 and the SPI flash memory 500 are connected through a 1-bit cable. The transmission signal S17 is a read signal to read data storing in the SPI flash memory 500.

At first, the voltage base VB of the transmission signal S17 is set as being the first base VBa to activate the channel.

Then, the transmission signal S17 is pulled down or up to form the glitches GT11, GT12 (or GT21, GT22, GT23, GT24), such that a read command RC is formed. The glitches GT11, GT12 are shown in FIG. 3, the glitches GT21, GT22, GT23, GT24 are shown in FIG. 5.

Next, the transmission signal S17 is pulled down or up to form the glitches GT11, GT12 (or GT21, GT22, GT23, GT24), such that a 32 bit address AD is formed.

Then, the host 600 is switched to an input mode, the SPI flash memory 500 is switched to an output mode, and the transmission signal S17 is kept at the first base VBa until the end of the virtual cycle time CT. The virtual cycle time CT is used for the flash memory 500 to prepare data and is independent of any timing clock. At the end of the virtual cycle time CT, the SPI flash memory 500 can immediately output data.

Next, the transmission signal S17 is pulled down or up, by the SPI flash memory 500, to form the glitches GT11, GT12 (or GT21, GT22, GT23, GT24), such that a flash outputting data DT is formed.

Then, the voltage base VB of the transmission signal S17 is set as being 0V, the channel is closed and the host 600 is returned to be a standby mode.

Base on above, the host 600 can successfully read the flash outputting data DT stored in the SPI flash memory 500 without any clock signal.

Figure 18:
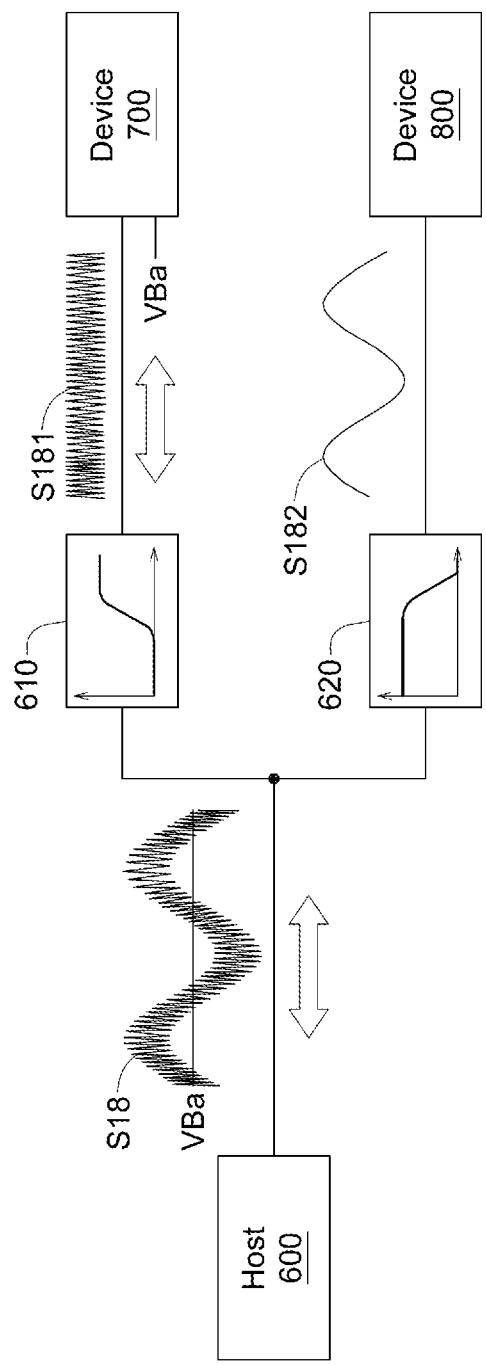
FIG. 18 shows a transmission signal according to another embodiment.

Refer to FIG. 18, which shows a transmission signal S18 according to another embodiment. In FIG. 18, the transmission signal S18 is an analog signal which is partially pulled down or up to form the glitches GT11, GT12 (or GT21, GT22, GT23, GT24). The glitches GT11, GT12 are shown in FIG. 3, the glitches GT21, GT22, GT23, GT24 are shown in FIG. 5. A frequency of the glitches GT11, GT12 (or GT21, GT22, GT23, GT24) is larger than a frequency of the analog signal.

Figure 19:
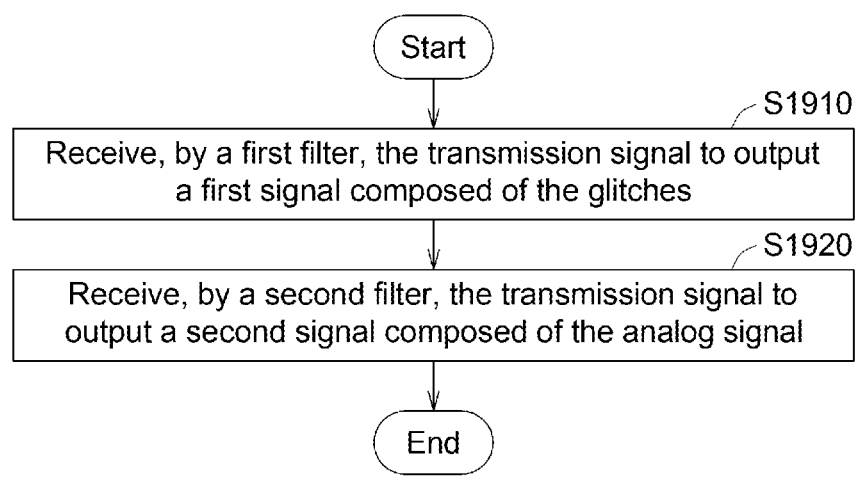
FIG. 19 shows a flowchart of the operation for transmitting the transmission signal in FIG. 18.

Refer to FIG. 19, which shows a flowchart of the operation for transmitting the transmission signal S18 in FIG. 18. In step S1910, a first filter 610, which is a high-pass filter, receives the transmission signal S18 to output a first signal S181 composed of the glitches GT11, GT12 (or GT21, GT22, GT23, GT24). As such, the device 700 receives the digital connect in the first signal S181.

In step S1920, a second filter 620, which is a low-pass filter, receives the transmission signal S18 to output a second signal S182 composed of the analog signal. As such, the device 800 receives the analog connect in the second signal S182.

The step S1910 and the step S1920 can be performed at the same time. Base on above, the transmission signal S18 has digital content and analog content. The digital content and the analog content can be transmitted at the same time, so the transmission efficiency is greatly improved.

According to the embodiments of the data transmission system and operation method thereof disclosed above, the glitches are used to represent the digital content, so the communication can be performed without clock edge sampling. Therefore, the signal quality van be maintained even at high frequencies. Further, the voltage base is used for selecting the devices, so the number of electrical connections can be reduced.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A data transmission system, comprising:
    a host, configured to set a voltage base of a transmission signal, and configured to pull down or up the transmission signal based on the voltage base of the transmission signal to form a plurality of glitches on the transmission signal, wherein the transmission signal is pulled down and then instantly pulled up to form the glitches, or the transmission signal is pulled up and then instantly pulled down to form the glitches; and the glitches are values for representing digital contents for the data transmission system;
    a first device, connected to the host to receive the transmission signal, wherein the first device obtains a digital content of the transmission signal according to the glitches on the transmission signal, if the voltage base of the transmission signal is set as a first base; and
    a second device, connected to the host to receive the transmission signal, wherein the second device obtains the digital content of the transmission signal according to the glitches on the transmission signal, if the voltage base of the transmission signal is set as a second base.

2. The data transmission system according to claim 1, wherein the glitches that are formed by pulling up from the voltage base of the transmission signal have identical amplitude, and the glitches that are formed by pulling down from the voltage base of the transmission signal have identical amplitude, such that each of the glitches is represented one bit data.

3. The data transmission system according to claim 1, wherein the glitches that are formed by pulling up from the voltage base of the transmission signal have X kinds of amplitudes, and the glitches that are formed by pulling down from the voltage base of the transmission signal have X kinds of amplitudes, such that each of the glitches is represented X bits data.

4. The data transmission system according to claim 1, wherein
the first device includes a first direct memory access (DMA) unit, the first DMA unit of the first device is configured to set a voltage base of a delivery signal, and configured to pull down or up the delivery signal based on the voltage base of the delivery signal to form a plurality of glitches on the delivery signal;
the second device includes a second DMA unit connected to the first DMA unit to receive the delivery signal, wherein the second DMA unit of the second device obtains a digital content of the delivery signal according to the glitches on the delivery signal, if the voltage base of the delivery signal is set as the second base.

5. The data transmission system according to claim 1, wherein the host, the first device and the second device are connected through a bus having a plurality of input/output channels.

6. The data transmission system according to claim 1, wherein the transmission signal is an analog signal which is partially pulled down or up to form the glitches, a frequency of the glitches is larger than a frequency of the analog signal.

7. The data transmission system according to claim 5, wherein each of the input/output channels has a buffer.

8. The data transmission system according to claim 7, wherein size of each of the buffers is larger than or equal to 2 bits.

9. The data transmission system according to claim 6, further comprising:
a first filter, configured to receive the transmission signal and output a first signal composed of the glitches; and
a second filter, configured to receive the transmission signal and output a second signal composed of the analog signal.

10. An operation method of a data transmission system, wherein the data transmission system comprises a host, a first device and a second device, the first device and the second device are connected to the host, and the operation method of the data transmission system comprises:
setting, by the host, a voltage base of a transmission signal;
pulling down or up, by the host, the transmission signal based on the voltage base of the transmission signal to form a plurality of glitches on the transmission signal, wherein the transmission signal is pulled down and then instantly pulled up to form the glitches, or the transmission signal is pulled up and then instantly pulled down to form the glitches; and the glitches are values for representing digital contents for the data transmission system;
receiving, by the first device and the second device, the transmission signal;
obtaining, by the first device, a digital content of the transmission signal according to the glitches on the transmission signal, if the voltage base of the transmission signal is set as a first base; and
obtaining, by the second device, the digital content of the transmission signal according to the glitches on the transmission signal, if the voltage base of the transmission signal is set as a second base.

11. The operation method of the data transmission system according to claim 10, wherein the glitches that are formed by pulling up from the voltage base of the transmission signal have identical amplitude, and the glitches that are formed by pulling down from the voltage base of the transmission signal have identical amplitude, such that each of the glitches is represented one bit data.

12. The operation method of the data transmission system according to claim 10, wherein the glitches that are formed by pulling up from the voltage base of the transmission signal have X kinds of amplitudes, and the glitches that are formed by pulling down from the voltage base of the transmission signal have X kinds of amplitudes, such that each of the glitches is represented X bits data.

13. The operation method of the data transmission system according to claim 10, wherein the first device includes a first direct memory access (DMA) unit, and the second device includes a second direct memory access (DMA) unit, the operation method of the data transmission system further comprises:
setting, by the first DMA unit of the first device, a voltage base of a delivery signal;
pulling down or up, by the first DMA unit of the first device, the delivery signal based on the voltage base of the delivery signal to form a plurality of glitches on the delivery signal;
receiving, by the second DMA unit of the second device, the delivery signal; and
obtaining, by the second DMA unit of the second device, a digital content of the delivery signal according to the glitches on the delivery signal, if the voltage base of the delivery signal is set as the second base.

14. The operation method of the data transmission system according to claim 10, wherein the host, the first device and the second device are connected through a bus having a plurality of input/output channels.

15. The operation method of the data transmission system according to claim 10, wherein the transmission signal is an analog signal which is partially pulled down or up to form the glitches, a frequency of the glitches is larger than a frequency of the analog signal.

16. The operation method of the data transmission system according to claim 14, wherein each of the input/output channels has a buffer, the operation method of the data transmission system further comprises:
sequentially storing the digital content in each of the buffers; and
reading a first bit in each of the buffers, when all of the first bits of the buffers are stored the digital content.

17. The operation method of the data transmission system according to claim 16, wherein size of each of the buffers is larger than or equal to 2 bits.

18. The operation method of the data transmission system according to claim 15, further comprising:
receiving, by a first filter, the transmission signal to output a first signal composed of the glitches; and
receiving, by a second filter, the transmission signal to output a second signal composed of the analog signal.

19. A data transmission system, comprising:
a host, configured to pull down or up the transmission signal based on the voltage base of the transmission signal to form a plurality of glitches on the transmission signal, wherein the transmission signal is pulled down and then instantly pulled up to form the glitches, or the transmission signal is pulled up and then instantly pulled down to form the glitches; and the glitches are values for representing digital contents for the data transmission system; and
a device, connected to the host to receive the transmission signal, wherein the device obtains a digital content of the transmission signal according to the glitches on the transmission signal.

20. The data transmission system according to claim 19, wherein the glitches that are formed by pulling up from the voltage base of the transmission signal have X kinds of amplitudes, and the glitches that are formed by pulling down from the voltage base of the transmission signal have X kinds of amplitudes, such that each of the glitches is represented X bits data.

\* \* \* \* \*